UNITED STATES PATENT OFFICE.

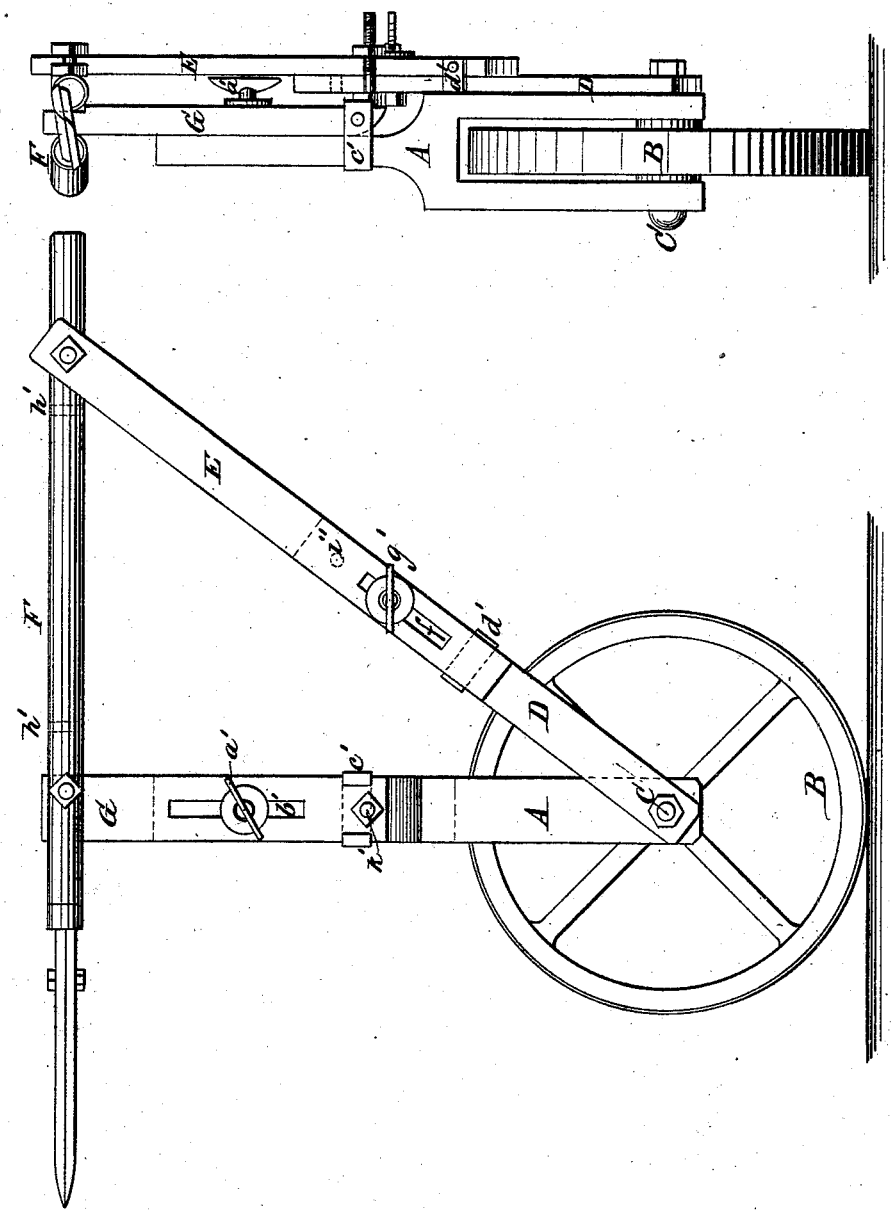

HENRY UNKRICH, OF FAIRFIELD, IOWA.

IMPROVEMENT IN HEDGE-TRIMMERS.

Specification forming part of Letters Patent No. 216,915, dated June 24, 1879; application filed April 15, 1879.

*To all whom it may concern:*

Be it known that I, HENRY UNKRICH, of Fairfield, in the county of Jefferson and State of Iowa, have invented a new and Improved Hedge-Trimmer, of which the following is a specification.

Figure 1 is a side elevation of the trimmer. Fig. 2 is a front elevation of the same.

Similar letters of reference indicate corresponding parts.

The object of this invention is to provide a device by which the sides and tops of hedges can be trimmed more accurately, more quickly, and with much less labor than by any other trimmer now in use.

The invention consists of the forked vertical standard A, in the fork of which revolves the wheel B on the axle C, which passes horizontally through the forks at their ends.

Strapped to the upper part of the standard with a metallic band, $c'$, is a slotted prolongation, G, of the same, which is held firmly against the standard by the thumb-screw $a'$, which passes through the slot $b'$.

Pivoted at its lower end upon the axle C is the brace D, and strapped to this by the band $d'$ is its slotted upward prolongation E, through the slot of which passes the thumb-screw $g'$, by which it is further secured to and adjusted on the brace.

Secured to the upper ends of the standard and brace prolongations with suitable bolts passing through one of the handles, as shown, are the shears F. As shown in the drawings, it will be seen that these shears are set to trim the top of the hedge.

When it is desired to trim the side of the hedge, the shears are detached from the position, as shown, partially reversed, and secured in their place again by passing the bolts through the holes $h'$ $h'$ in the handle, that are at right angles with the other bolt-holes.

The shears may be adjusted higher or lower within a considerable range by sliding their prolongations up or down on the standard and brace, and securing them in position with the thumb-screws.

For side trimming, the brace prolongation may be entirely removed, and the shears secured to the brace and the lower end of the standard prolongation by the bolts at $i'$ and $k'$, respectively, the movable handle of the shears being upward.

It is obvious that the handles of the shears may be made long enough for the operator to keep out of the reach of the throws on a hedge, and that with long handles, and a consequently better leverage, the trimming can be done more easily and quickly, and larger branches or twigs can be cut off than by the use of shears with short handles.

It is obvious, too, that very heavy shears and handles can be moved and manipulated with great ease, supported as they are on a broad-rimmed wheel.

Sufficient range of adjustment can be secured by the slotted prolongations, and by properly-placed bolts and bolt-holes, for the application of the shears to hedges of any kind or character.

Having thus described my invention, I claim as new and desire to secure by Letters Patent—

1. The within-described hedge-trimmer, consisting of standard A, wheel B, axle C, brace D, brace prolongation E, standard prolongation G, bands $c'$ and $d'$, thumb-screws $a'$ and $g'$, and shears F, substantially as herein shown and described.

2. In the construction of a hedge-trimmer, the adjustable prolongations or slides E and G, in combination with the adjustable shears F, substantially as and for the purpose described.

HENRY UNKRICH.

Witnesses:
J. J. CUMMINGS,
J. F. HUNTZINGER.